United States Patent [19]
Broschard, III et al.

[11] Patent Number: 5,667,408
[45] Date of Patent: Sep. 16, 1997

[54] SMART CARD CONNECTOR WITH PRELOADED DATA CONTACTS

[75] Inventors: John L. Broschard, III, Hershey; Edmund L. Jacobs, Harrisburg; Ronald E. Katzaman, Enola; John T. Larkin, Jr., New Cumberland, all of Pa.

[73] Assignee: The Whitaker Corporation, Wilmington, Del.

[21] Appl. No.: 431,210

[22] Filed: Apr. 28, 1995

Related U.S. Application Data

[63] Continuation-in-part of Ser. No. 348,019, Dec. 1, 1994.
[51] Int. Cl.$^6$ ................................................ H01R 23/70
[52] U.S. Cl. ........................................ 439/630; 439/260
[58] Field of Search ............................... 439/188, 489, 439/629–637; 200/51.1

[56] References Cited

U.S. PATENT DOCUMENTS

| | | | |
|---|---|---|---|
| 3,858,163 | 12/1974 | Goodman et al. | |
| 4,166,667 | 9/1979 | Griffin | 439/637 |
| 4,184,735 | 1/1980 | Ammon et al. | 439/637 |
| 4,900,273 | 2/1990 | Pernet | 439/630 |
| 4,976,630 | 12/1990 | Schuder et al. | 439/260 |
| 5,013,255 | 5/1991 | Juret et al. | 439/260 |
| 5,259,777 | 11/1993 | Schuder et al. | 439/188 |
| 5,269,707 | 12/1993 | Reichardt et al. | 439/630 |
| 5,320,552 | 6/1994 | Reichardt et al. | 439/331 |
| 5,334,034 | 8/1994 | Reichardt et al. | 439/188 |
| 5,334,827 | 8/1994 | Bleier et al. | 235/492 |
| 5,336,877 | 8/1994 | Raab et al. | 235/475 |
| 5,370,544 | 12/1994 | Reichardt et al. | 439/188 |
| 5,380,997 | 1/1995 | Hania et al. | 439/630 |

FOREIGN PATENT DOCUMENTS

| 8800401 | 1/1988 | WIPO | 439/630 |
|---|---|---|---|

OTHER PUBLICATIONS

U.S. Patent Application Serial No. 08/348,019 Abstract and drawings only filed Dec. 1, 1994.
U.S. Patent Application Serial No. 08/348,015 Abstract and drawings only filed Dec. 1, 1994.
U.S. Patent Application Serial No. 08/348,025 Abstract and drawings only filed Dec. 1, 1994.

*Primary Examiner*—Hien Vu

[57] ABSTRACT

A smart card connector with a card slot 10 for receiving a smart card employs an end position switch comprising a single resilient contact 14 engaging a stationary post 16 to detect full insertion of a smart card. The resilient contact 14 and the post 16 are mounted in the rear of a housing base 4 which includes resilient data contacts 12 mounted in contact cavities 38 located at the front and rear of the housing base. Contact arms 88 on the data contacts are preloaded so that each contact engages the smart card with a prescribed force and extends into the housing slot for a prescribed distance. The contact arms 88 are located in channels 34 in the housing base and lateral protrusions 36 extending from separator ribs 32 defining the contact channels 34 engage the contacts to preload them. The housing base 4 also includes resilient cantilever diverter springs 18, molded into the housing base which both protect the data contacts 12 and provide a reactive force to counter the force exerted by the normally closed resilient contact 14 upon full insertion of the smart card.

18 Claims, 11 Drawing Sheets

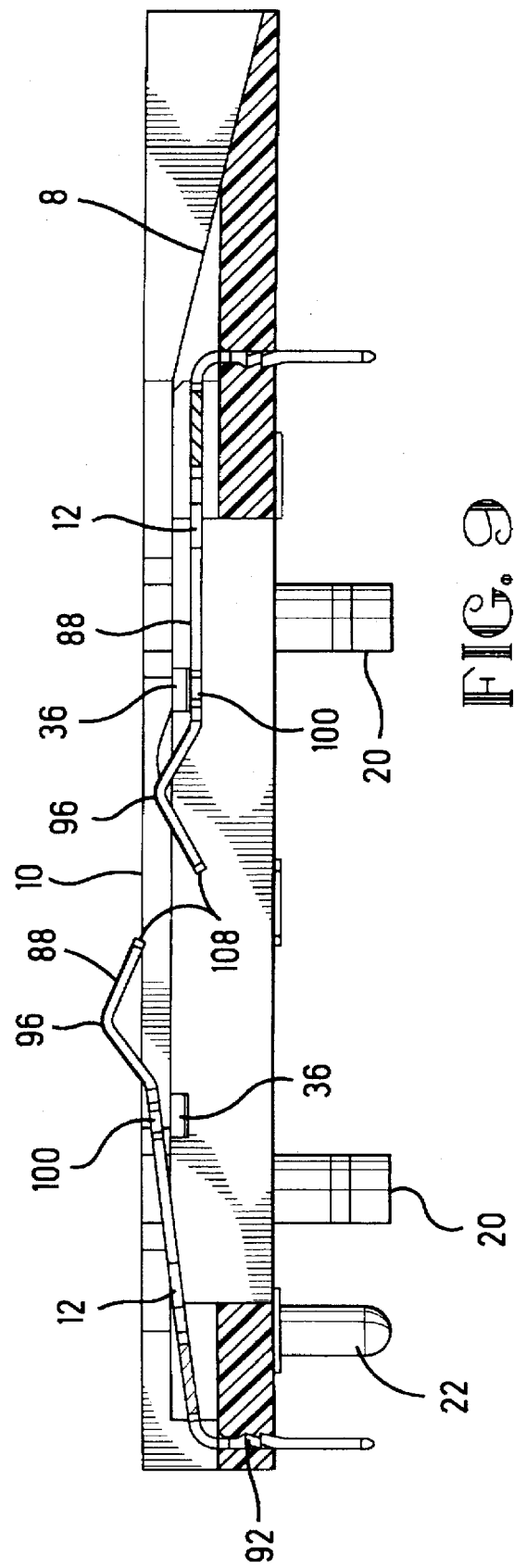

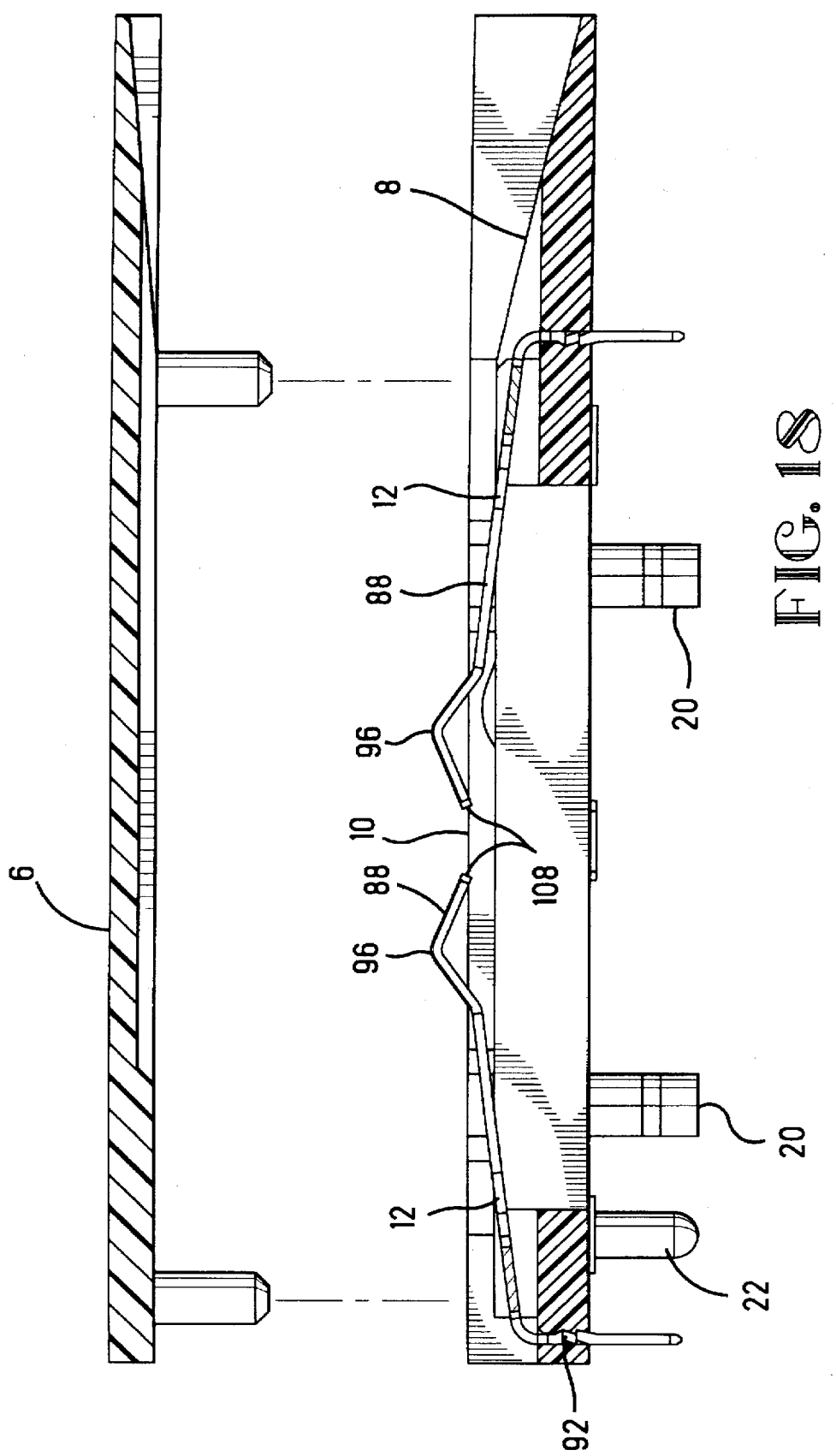

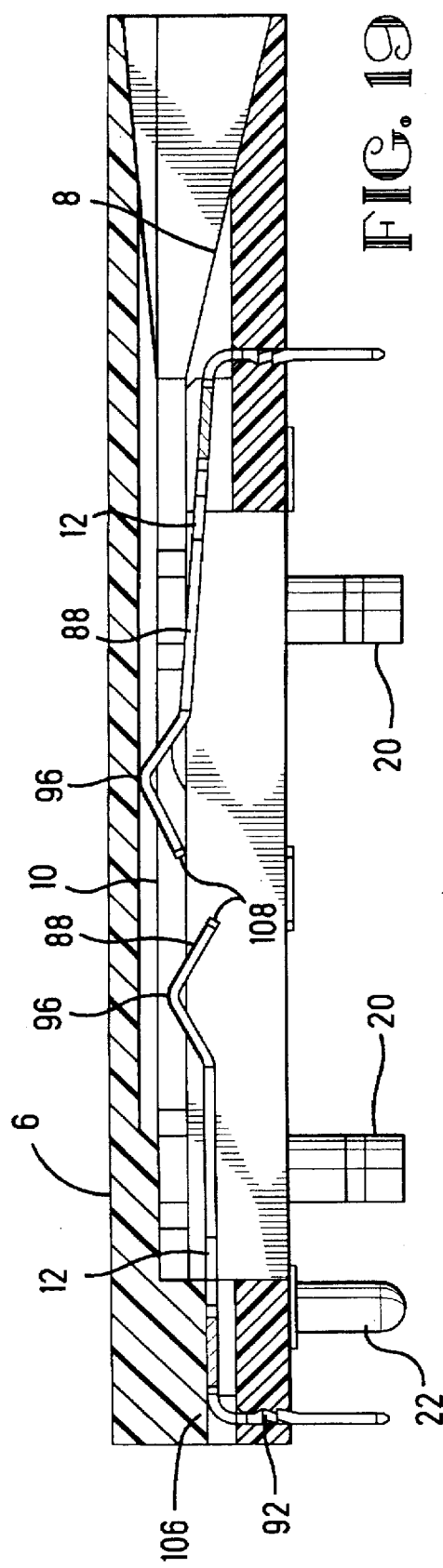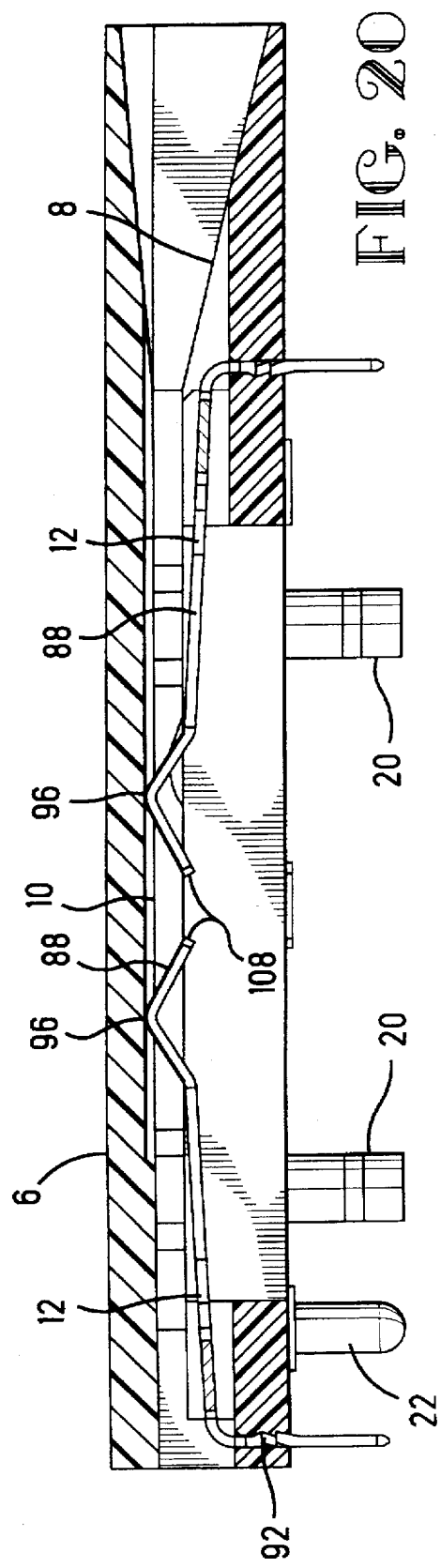

SMART CARD CONNECTOR WITH PRELOADED DATA CONTACTS

CROSS REFERENCE TO PENDING APPLICATION

This application is a continuation-in-part of prior co-pending application Ser. No. 08/348,019 filed Dec. 1, 1994 (Attorney's Docket No. 16039) issued Jan. 30, 1997. The subject matter of this application is also related to application Ser. No. 08/348,015 filed Dec. 1, 1994 (Attorney's Docket No. 16037) and to application Ser. No. 08/348,025 filed Dec. 1, 1994 (Attorney's Docket No. 16038).

FIELD OF THE INVENTION

This invention relates to apparatus for use with smart cards, or chip cards, which contain memory or other intelligence on the card, and more specifically to devices, such as card readers, for interfacing with cards of this type. More specifically this invention relates to connectors for use with smart cards, the connectors being a component of the smart card reader or other smart card interface device. Still more specifically this invention relates to smart card connectors including data contacts that are preloaded in the connector housing.

BACKGROUND OF THE INVENTION

Smart cards or chip cards, as presently used, consist of a card of approximately the same size as a standard credit card that contain intelligence on the card itself. This intelligence is typically in the form of a memory circuit that can contain read only memory or read/write memory (random access memory) on the card. The information stored in the card's memory can then be used by the card reader or card interface device to detect certain information stored on the card, such as an instantaneous bank balance. The information stored in the card's memory can also be instantaneously updated, for example, the alteration of the security status of a specific badge holder. Cards of this type can also be used with cable television decoders or descramblers and with satellite systems.

Although the preferred embodiments of this invention are specifically directed to smart cards, it is equally applicable to connectors or similar devices. For example, this invention would be applicable to the use of connectors for smart keys and could even be used for memory cards of the type generally referred to as PCMCIA cards.

Among the problems that must be overcome for card connectors and card readers of this type to attain a satisfactory level of performance is that the connectors must function for a large number of card insertions, and the card connector must function in environments which can cause deterioration or damage to the contact interface of the data contacts and the end position switches. Typically the card connectors will be used in applications, such as in automatic teller machines or in security devices, in which a large number of cards will be used with a single card connector or reader. Over time the cards used in these applications can become deformed and can collect foreign substances that can interfere with the operation of the card reader. The cards can also become warped. The card connectors can also be used in environments, such as outdoor use in automatic teller machines, in which they are susceptible to environment contaminants, or in which oxides could build up over time. Since these applications employ relatively low electrical potential and current, the energy present in power applications to burn off these contaminants or oxides is not available. Therefore, it is desirable that a wiping contact between the data contacts and the card contact pads be established to ensure removal of contamination from the contact area. This wiping contact, however, must not be accompanied with excessive force that might damage the plating on the data contacts or the resilient data contacts themselves. A constant contact or wiping force is, therefore, desirable. This constant contact force can only be achieved by precisely positioning the data contacts relative to the smart card. Such precise positioning can be achieved by complicated and expensive card readers and/or by maintaining precise tolerances for the individual subcomponents and for the final assembly. Both of these options have added cost to prior art configurations.

U.S. Pat. No. 4,900,273, U.S. Pat. No. 5,103,255, and U.S. Pat. No. 5,334,034 disclose smart card readers or connectors. None of these smart connectors appear to employ means for reducing wear on data contacts in the connector or for preloading the data contacts. U.S. Pat. No. 5,380,997 discloses a card reader including a card holder and both reading wipers or contacts and other contacts biased into a plane further from the base than the reading wipers or contacts. U.S. Pat. No. 5,334,827 discloses a chip card reader in which the contact is in resilient abutment with an abutment surface on the housing and assumes a straight biased position.

SUMMARY OF THE INVENTION

The card reader or card reader connector comprising the subject matter of this invention includes resilient data contacts that are preloaded. Preloading, as used herein, refers to loading the resilient contact or spring before the contact engages a smart card or chip card inserted into a card slot in the connector. By preloading the data contact, the mating contact point can be precisely positioned and the mating force can also be controlled within prescribed limits. The tolerances necessary for achieving the desired contact positioning and force can add cost to nonpreloaded smart card connector configurations.

The preferred embodiment of the invention depicted herein includes two rows of data contacts mounted in a housing base. Contact channels are formed by separator ribs in the base of the connector. The contact terminals engage protrusions on the separator rib walls to position resilient contact arms on the data contacts in a position different from that which would be occupied by the contact in its neutral state with no resilient stresses. The contact section of the contacts thus protrude into the card contact slot by a prescribed amount.

In the preferred embodiment, each data contact is mounted in a contact cavity. To ensure precise positioning of the contact in the contact cavity, barbs on the data contact force the contact into engagement with one wall of the contact cavity. The contact is precisely positioned relative to this wall and variations in the size of the contact cavities or in the contacts themselves are not as critical to the positioning of the contact point in the card slot.

BRIEF DESCRIPTION OF THE DRAWINGS

FIG. 9 is a side sectional view taken along section 9—9 in FIG. 3 to which two representative data contacts have been added. Each data contact extends from opposite ends of the same channel with one contact snapped into its preloaded position and another contact shown in its neutral position prior to pressing the contact into its preloaded position.

FIG. 18 is a view, similar to FIGS. 9 and 17 of a second alternate embodiment of this invention in which the cover deflects the contacts so that the rear contacts do not cause stubbing.

FIG. 19 is a view of the assembled embodiment of FIG. 17.

FIG. 20 is a view of the assembled embodiment of FIG. 18.

DETAILED DESCRIPTION OF THE PREFERRED EMBODIMENTS

Figure 1:
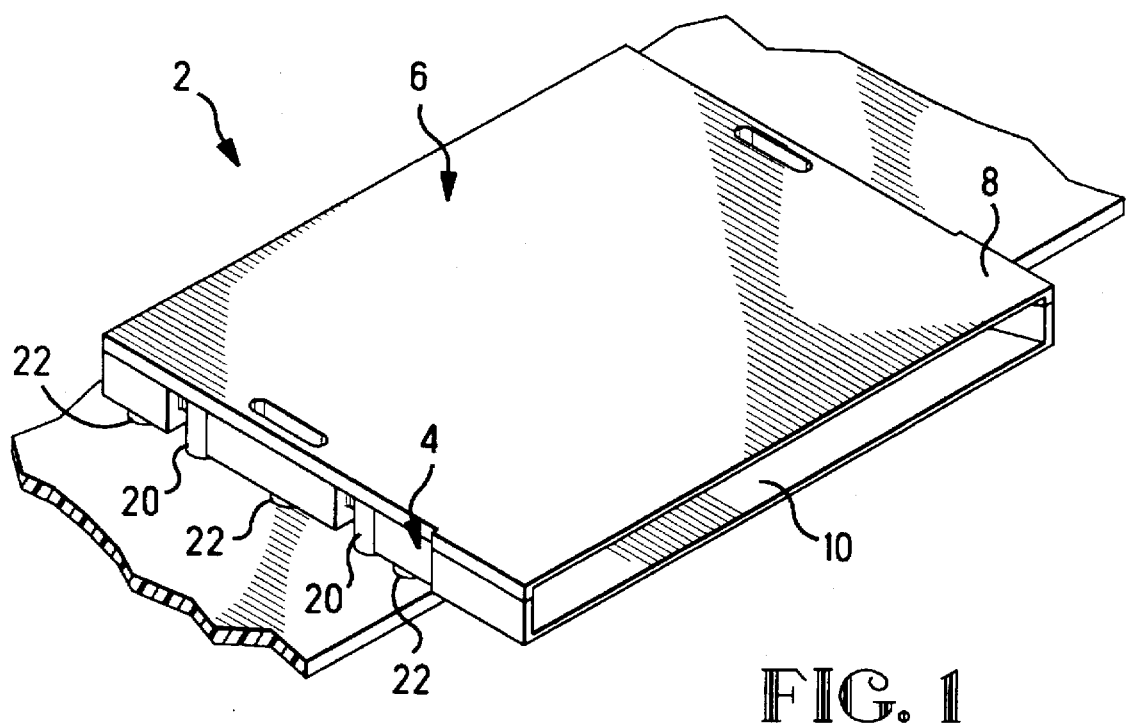
FIG. 1 is an isometric view of a representative embodiment of a smart card connector mounted on a printed circuit board.

The smart card connector 2 shown in FIG. 1 is intended to be mounted in a printed circuit board and to provide the interface in which a smart card can be inserted so that data can be read from or written into the smart card by the smart card interface circuitry. The embodiment shown in FIG. 1 includes a housing base 4 and housing cover 6, both of which have a scoop or card entry shroud 8 at the front of the housing. The base 4 and cover 6 form a card slot 10 that extends from the front of the housing through the shroud or scoop 8 to the rear of the smart card connector 2.

The housing base 4 and the housing cover 6 are each injection molded from a conventional thermoplastic material. In the preferred embodiment of this invention, these housing components are molded from a PCT plastic such as Ektar, a plastic supplied by Kodak.

FIG. 1 also shows mounting posts 20 extending from the bottom of the housing base 4 to secure the smart connector to a printed circuit board. FIG. 1 also shows standoffs 22 that position the smart connector above the printed circuit board to allow for proper installation and cleaning of the solder contacts on the printed circuit board.

Figure 2:
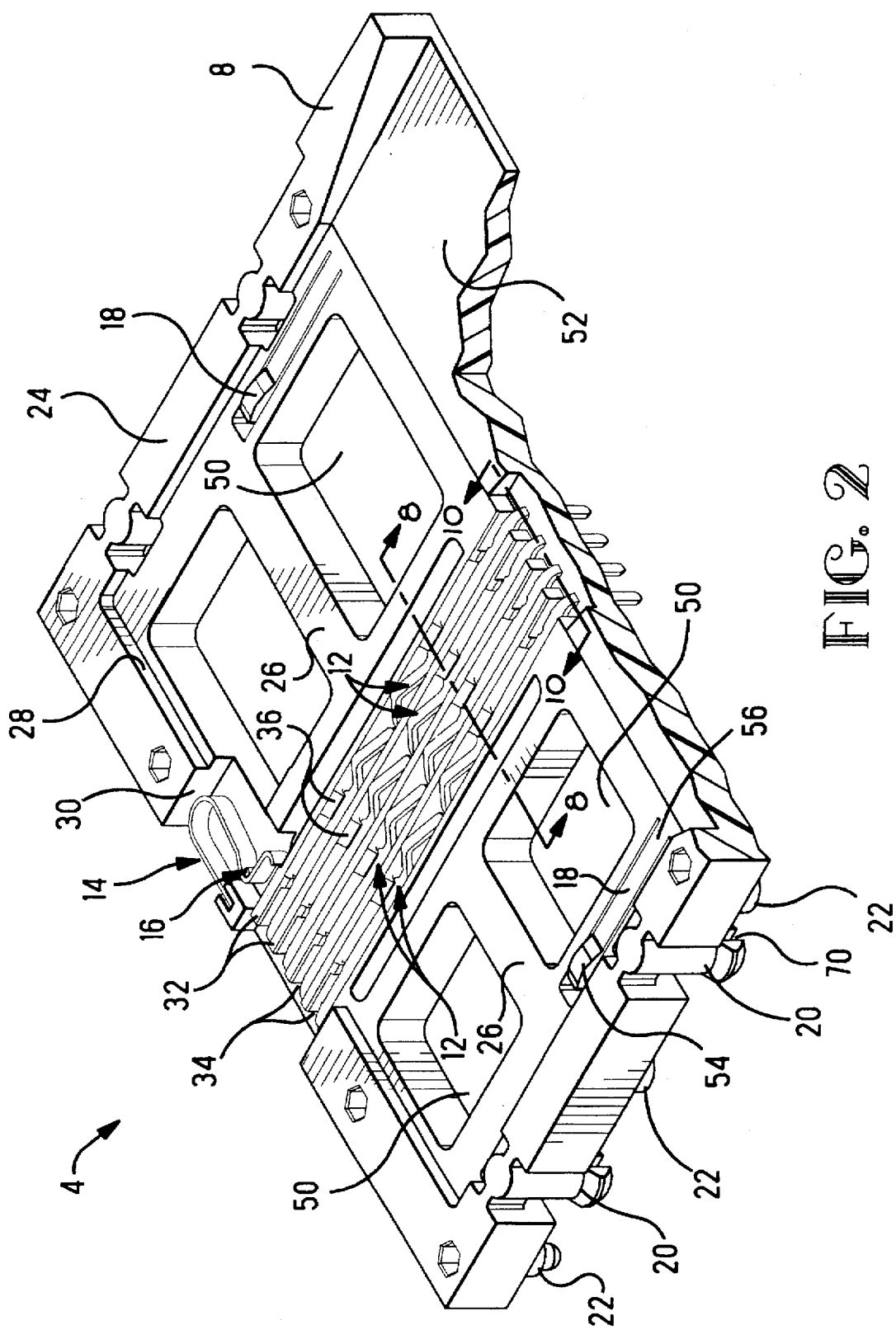
FIG. 2 is an isometric view of the smart connector housing base showing the position of data contacts, an end position switch and mounting posts for positioning the smart connector on a printed circuit board.

The housing base 4 is also shown in FIG. 2 where the upper surface of the housing base is shown. The upper surface of the housing base 4 comprises the bottom of the card slot 10. In the embodiment shown in FIG. 2, eight data contacts 12 are mounted in the housing base 4 in position to engage contact pads on a smart card inserted into the card slot 10. In this embodiment, four data contacts 12 extend from the front of the housing base 4 and four other offset contacts extend from the rear of the housing base 4. The data contacts are resilient and only the contact arms of the data contacts 4 extend above the upper surface of the housing base 4 to engage pads on a smart card inserted into the card slot 10. The smart connector 2 also includes a normally closed end position or end of stroke switch that is located at the rear of the card slot 10 and housing base 4. The end position switch is formed by a switch spring 14 and a switch post 16, both of which are anchored in the housing base 4. The switch spring 14 and the switch post 16 are positioned on one side of the four data contacts that extend from the rear of the housing base 4. The housing base also includes two diverter springs 18 that are part of the molded housing base 4. These diverters 18 are located slightly in front of the contact points of the front data contacts 12 and one diverter 18 is located on either side of the array of data contacts 12.

The housing base 4 has a peripheral rim 24 that extends around the two sides and partially along the rear of the upper surface of the housing base 4. The top of rim 24 is above the interior upper surface 26 and the gap formed between the top of the rim 24 and the surface 26 forms the lower half of the housing slot 10 in the assembled smart card connector 2. A shoulder 28 extends between peripheral rim 24 and surface 26 adjacent the two sides of the back of the housing base 4. This shoulder 28 serves as a card stop when a smart card is fully inserted into the housing slot 10. A recess 30, the lower surface of which is recessed below surface 26, is located between side portions of the rim 24 along the rear of the housing base 4. The four rear data contacts 12, the switch spring 14 and the switch post 16 are anchored to the housing base 4 in the recess 30. Separation ribs 32 extend up from the bottom of recess 30 to form contact channels 34 in which individual data contacts 12 are located. These separator ribs 32 and contact channels 34 extend from the rear of the housing base 4 to the scoop 8 at the front of the housing base. Four generally square openings 50 extend through the surface 26 from its top to the bottom. The four openings 50 located along the sides of the housing base 4, adjacent to the rim 24 are formed to eliminate unneeded plastic and are optional. Contact channels 34 extend between the openings 50 with each channel 34 containing two data contacts 12, one extending from the front and the second extending from the rear of the housing base 4. The mounting posts 20 and the standoffs 22 are molded as part of the rim 24 and each extends from the lower surface or rim 24. The lower half of the shroud of scoop 8 is partially shown at the front of the housing base 4 in FIG. 2. This shroud is shown broken away to expose the other elements of the housing base 1 and components mounted in the housing base. The inclined surface 52 on the shroud or scoop 8 provides a lead in for insertion of a smart card into the housing slot 10.

Figure 3:
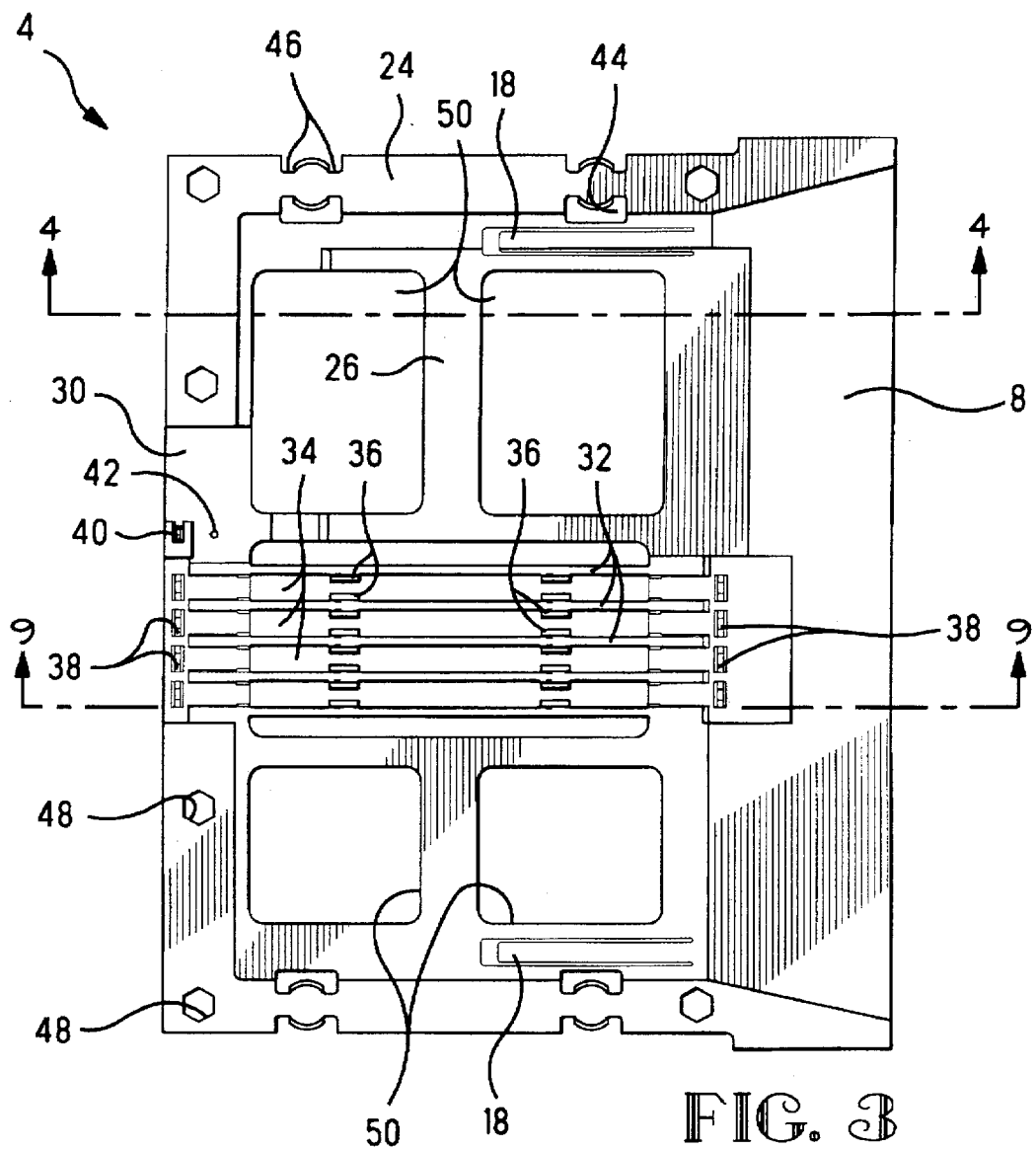
FIG. 3 is a top plan view of the smart connector housing base.
Figure 4:
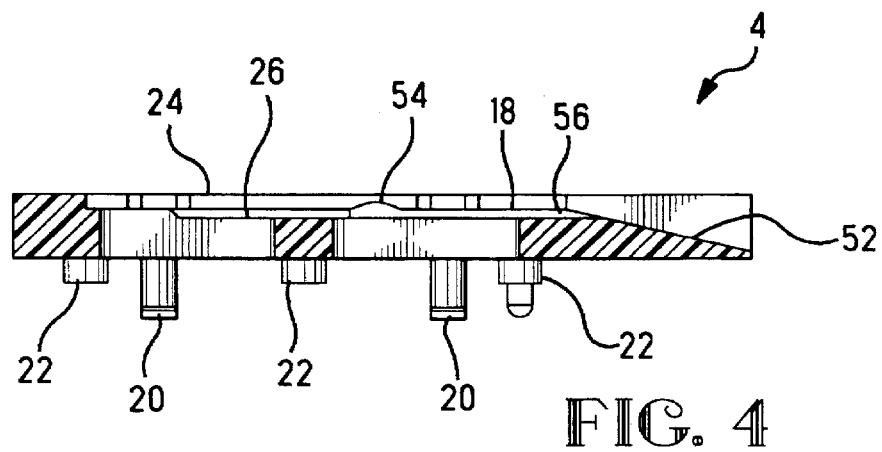
FIG. 4 is a side sectional view of the housing base taken along section lines 4—4 in FIG. 3 of the smart connector base showing the front shroud or scoop and the mounting posts.
Figure 5:
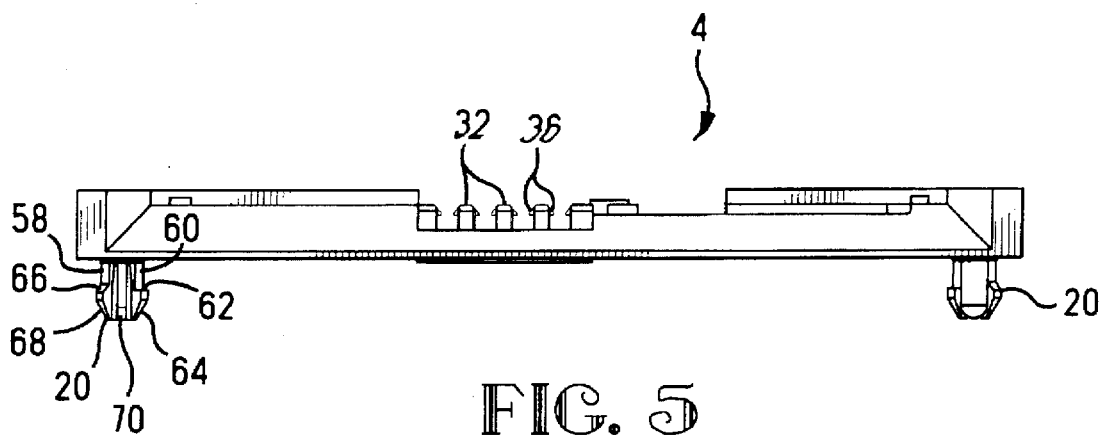
FIG. 5 is a fragmentary front view of the housing base showing separator ribs in the center of the base.

Other details of the housing base 4 are shown in the top plan view of FIG. 3, the side sectional view of FIG. 4 and the front view of FIG. 5. As previously discussed, the data contacts 12, the switch spring 14 and the switch post 16 are mounted in the housing base 4. Data contact mounting cavities 38, in which data contacts are inserted, are located in the front of the housing base 4, behind the shroud 8 and in the recess 30 formed at the rear of the housing base 4. Preload tabs 36 extend from the top of each separator rib 32 laterally into adjoining channels 34. There are two rows of preload tabs 36. The preloaded data contacts 12 will be positioned in the channels 34 and will extend below the channel preload tabs 36. The switch mounting hole 40 is located in the recess 30 to the rear of the switch post mounting hole 42, both of which are located on the side of the mounting holes 38 for the data contacts 12. The mounting posts 20 and the standoff posts 22 are shown extending from the lower surface of the housing base 4 along the outer edges. The housing base 4 is molded using a straight pull mold without side pulls. Clearance holes 44 and grooves 46 extend through the rim 24 on opposite sides of the mounting posts 20 so that latching and camming surfaces by be formed adjacent to the lower ends of the mounting posts. Six cover mounting holes 48 are located in the rim 24 along the sides and rear of the housing base 4. These holes 48 will receive cover mounting lugs to secure the cover 6 to the base 4 as will be apparent during the subsequent discussion of the cover. Alternatively eight holes and lugs can be used to attach the cover.

FIG. 4 shows the portion of the housing base 4 containing the diverter springs or resilient arms 18, the mounting posts 20 and the cover mounting holes 48. Each diverter spring 18 comprises a molded cantilever beam that is integral with the base 4. Two slots on either side of the diverter spring 18 join a top slot to define the diverter spring. This cantilever beam is formed during molding of the base by blades or walls that form the slots. As can best be seen in the side sectional view of FIG. 4, each diverter spring 18 has a raised semi-cylindrical boss 54 adjacent its free end and spaced from the base portion 56 of the cantilever diverter spring 18. This boss 54 normally extends above the upper surface 26 of the housing base 4 in the card slot area 10. When a card is inserted into the card slot 10, the card engages the boss 54 and the diverter 18 is forced downwardly while the card is urged upwardly toward the top of the slot 10. This action serves several purposes. First, it tends to provide a controlled lead-in for the card slot and prevents the card from snagging on any irregular surface on the housing base. Second, by urging the card upwardly, less force is exerted against the resilient data contacts 12, especially during relative movement between the card and the data contacts 12, thus tending to prolong the life of the data contacts 12. Engagement of the diverter spring 18 with the card also produces a frictional force that tends to prevent movement of the card back out of the slot and tends to resist the force exerted by the end position spring 14.

FIG. 3, 4 and 5 also show the configuration of the clearances 44 and 46 and upwardly facing surfaces 62 and 66 on the mounting posts 20 that are formed by molding pins extending through these clearance openings. Each mounting post comprises two separate legs extending form the lower surface of the housing base 4. These two legs are formed by a slot 70 extending between the lower surface of the base 4 and the free ends of the mounting posts 20. Each of the mounting post legs is flexible. A mounting post latching leg 60 is located on the interior side of slot 70 while a mounting post cinching leg 58 is located adjacent the exterior side of the housing base 4. Each of the legs has an enlarged section adjacent its distal end. The latching mounting post leg 60 has a downwardly facing beveled or inclined surface 64 and an upwardly facing latching surface 62 that extends perpendicular to the axis of the mounting post leg 60. When the housing base 4 is inserted downwardly into a mounting hole in a printed circuit board, the beveled surface 64 causes leg 60 to resiliently cam inwardly to permit entry of the leg 60 into the mounting hole. Once fully inserted, the latching surface 62 will engage the lower surface of the printed circuit board to prevent upward extraction of the housing base 4 and the smart card connector 2. Only an intentionally applied lateral force on mounting post leg 60 will disengage the latching surface 62 from the printed circuit board. The other mounting leg 58 also has a downwardly facing beveled surface 68 that again cams this leg inwardly to permit insertion of the mounting post 20 into a mounting hole. However, cinching leg 58 has an upwardly facing beveled surface 66. This upwardly facing beveled or inclined surface 66 does not latch against the bottom of a printed circuit board in the same manner as latching surface 62. Instead, this beveled surface engages the printed circuit board along the edge of the post mounting hole and pulls the housing base 4 and the smart connector 20 towards the printed circuit board on which it is mounted, if the thickness of the printed circuit board is less than its nominal dimension. The connector 2 will then fit snugly against the printed circuit board helping to ensure that the smart connector is properly portioned on the printed circuit board. Alternatively, the upwardly facing beveled surface 66 will provide a greater range of engagement with printed circuit boards having a thickness greater than its nominal dimension. For these thicker printed circuit boards, the latching surface 62 on mounting post leg 60 may not fully deploy because it remains within the confines of the printed circuit board hole. This is, of course, true for conventional mounting posts that employ only a perpendicular latching surface. The upwardly facing beveled surface 66 will, however, partially engage the lower surface or the printed circuit board, or at least the edge of the printed circuit board, to provide some latching engagement. This beveled surface will help take up any tolerances in the printed circuit board and the housing base 4 to ensure a tight rather than a lose fit. Latching is still maintained by the perpendicular surface 62 on the other leg 60 on most printed circuit boards.

Figure 13:
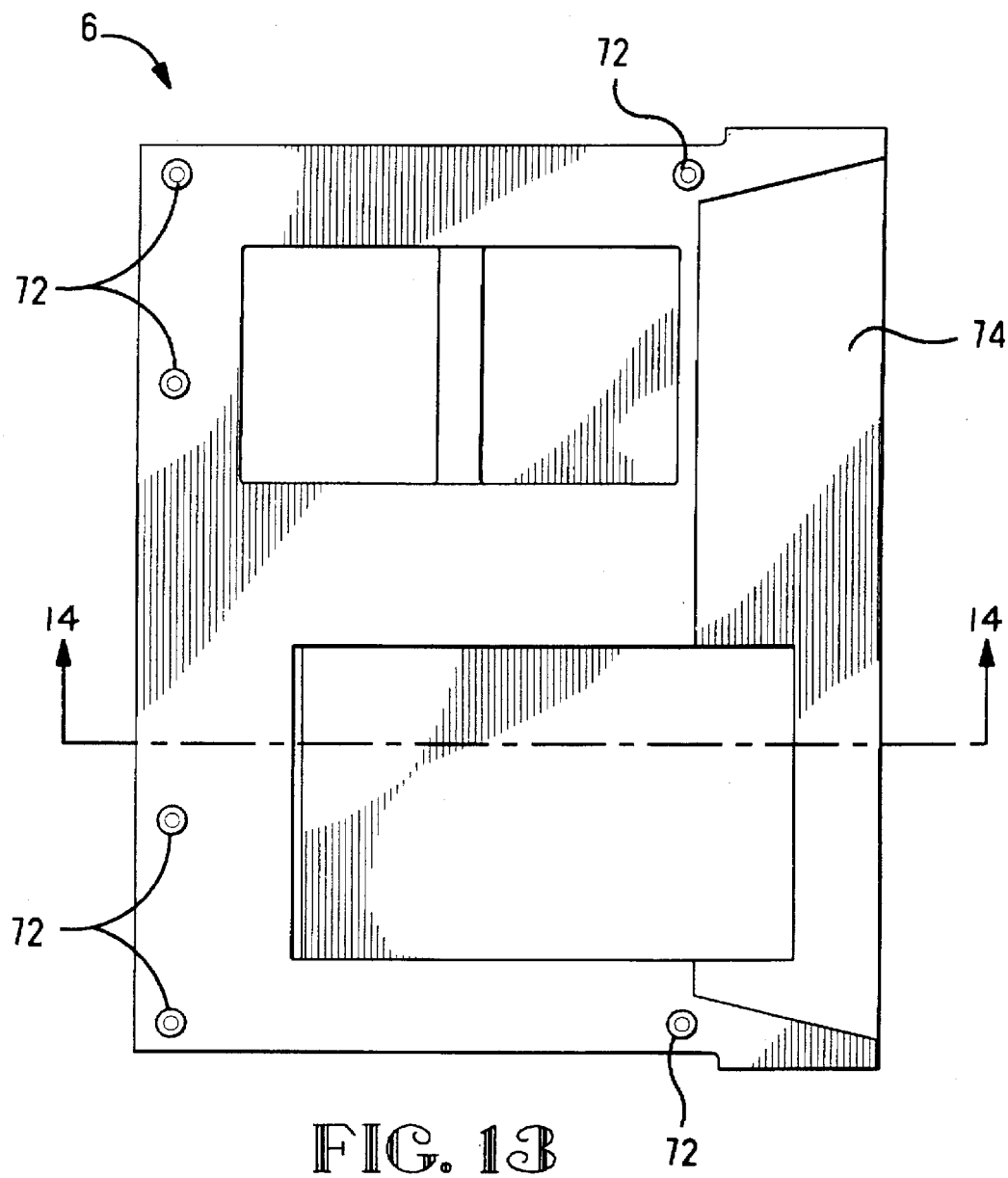
FIG. 13 is a view of the inner face of the cover.
Figure 14:
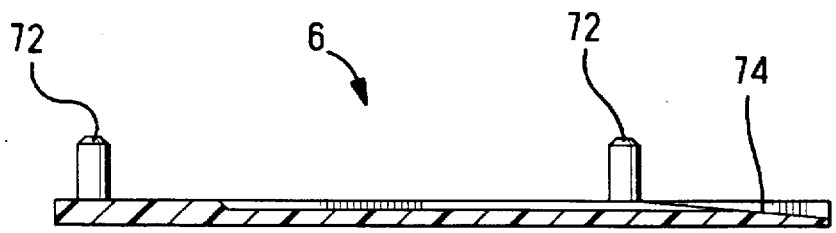
FIG. 14 is a side sectional view of the cover.

The housing of this embodiment of the smart connector is a two piece member consisting of the housing base 4 and a housing cover 6 that is attached to the base. The cover 6 is shown in FIGS. 13 and 14. Cover 6 is a substantially flat molded member formed of the same material as the base 4. A downwardly facing inclined surface 74 is located on the front of the cover 6, and, together with opposed inclined surface 52 on the base 4, forms the inclined entry scoop or shroud 8. The cover also has six downwardly extending lugs 72 molded into the bottom surface of the cover 6. These lugs 72 are positioned for insertion into lug mounting holes 48 on the housing base 4. The cover 6 then can be attached simply by inserting the lugs 72 into holes 48. Any number of conventional techniques can be used to secure the lugs 72 in holes 48. The lugs and holes can be dimensioned for an interference or press fit. Alternatively, the lugs 72 can be ultrasonically bonded in the holes 48 or they can be heat staked. The lugs can also be provided with latching surfaces to secure the cover 6 to the base 4. Alternatively, the cover 6 could be secured to the base by using latches that engage the opposite member around the periphery.

Figure 6:
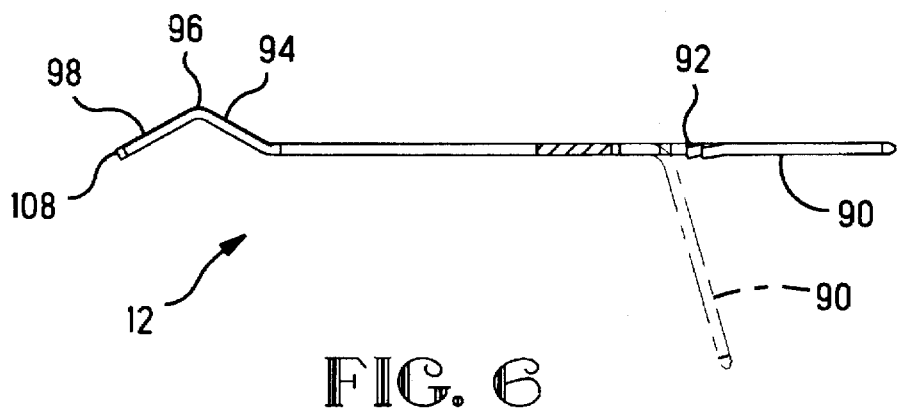
FIG. 6 is a view of a data contact showing the manner in which the lead section is formed down from the generally flat stamped contact form.
Figure 7:
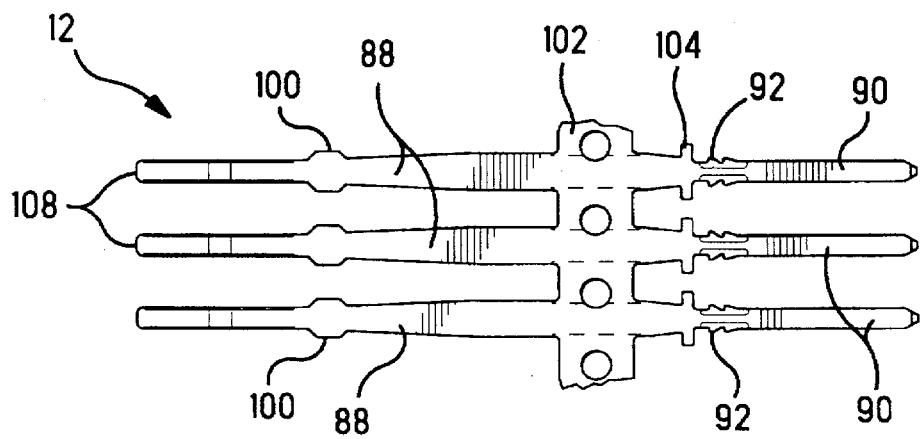
FIG. 7 is a top view of a strip of stamped data contacts.
Figure 8:
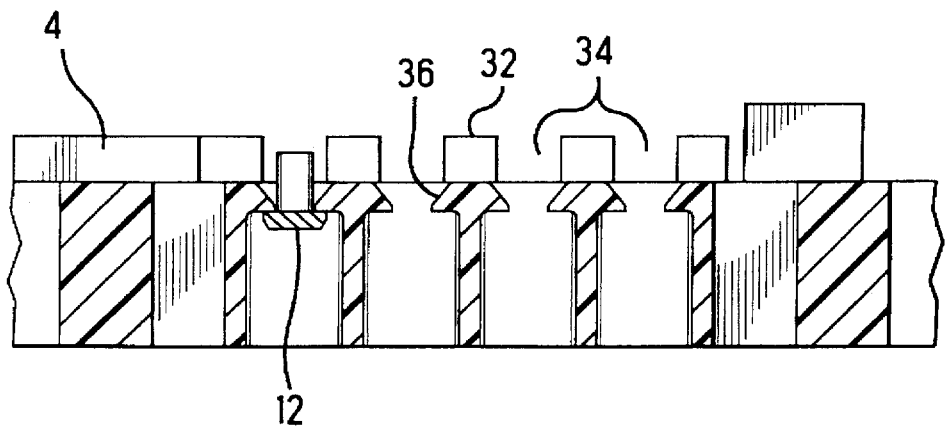
FIG. 8 is a sectional view taken along section 8—8 in FIG. 2 showing the separator ribs and channels with a representative data contact located in a representative channel.
Figure 10:
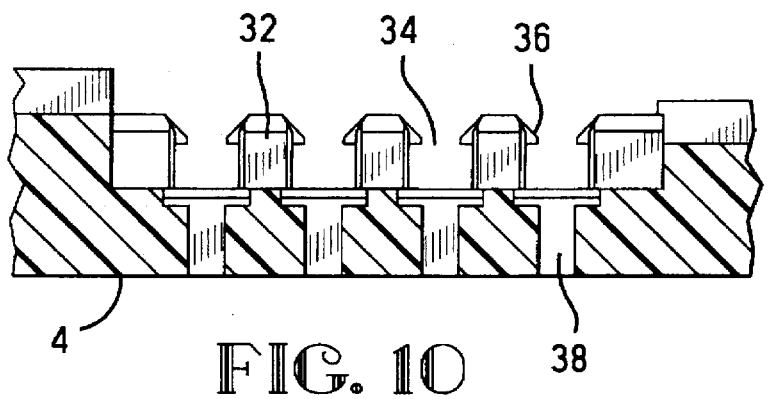
FIG. 10 is a sectional view taken along section 10—10 in FIG. 2 showing the contact cavities in which the data contacts are inserted.
Figure 11:
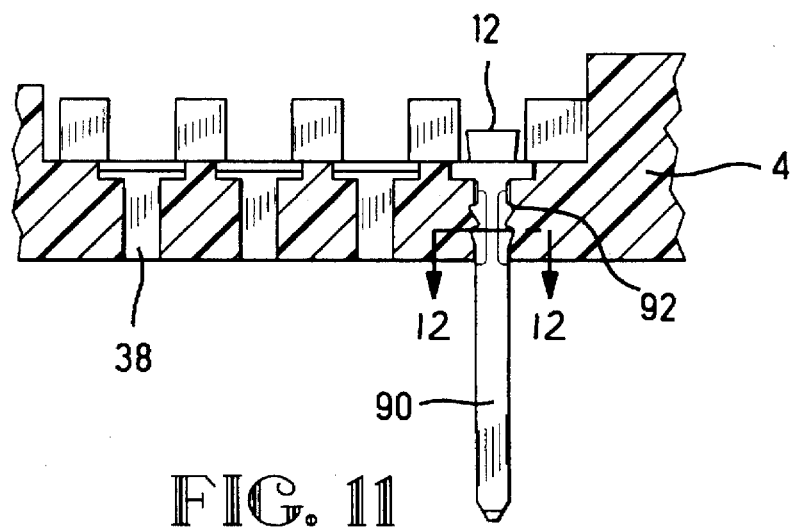
FIG. 11 is a view similar to FIG. 10 showing one representative data contact pressed into position in a contact cavity.
Figure 12:
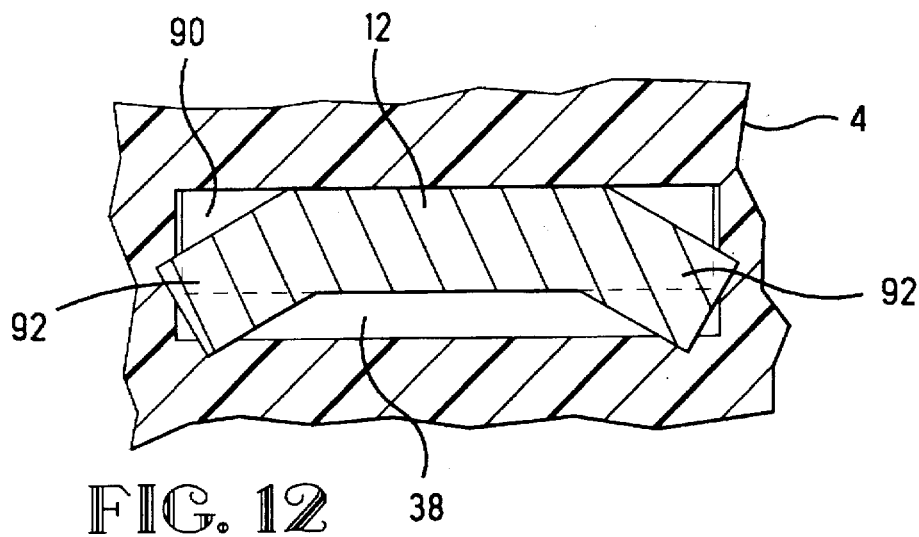
FIG. 12 is a cross-sectional view taken along section 12—12 in FIG. 11 showing the engagement of the contact barbs with the walls forming the contact cavity and showing the manner in which the contact is biased toward one wall of the cavity.

FIGS. 6 and 7 show the data contacts 12. These data contacts 12 are stamped and formed using a spring metal, such as phosphor bronze. The mating contact areas can be plated with a noble metal, such as gold. Lead portions to be soldered to a printed circuit board can be plated with a tin lead plating. These contacts are substantially conventional resilient contacts that include a contact arm 88 with a contact point or apex 98 located adjacent its distal end. The contact point or apex 98 is part of a convex section with two inclined sections 94 and 98 located on either side of the apex 96. Preload tabs 100 extend laterally from the contact arms 88 adjacent the convex contact portion. As shown in FIG. 7, each of the contact arms 88 is tapered. The opposite end of the data contact 13 is bent through an angle, initially of less than ninety degrees, to form an anchoring leg and solder tail section 90. This solder tail 90 comprises a lead section that will extend to the exterior of the housing for establishing electrical connection with external circuitry, normally part of the printed circuit board on which the connector 2 is mounted. Anchoring barbs 92 are formed adjacent the bend so that the data contacts 12 can be press fit into the contact mounting cavities 38 at the front and the rear of the housing base 4. Two anchoring barbs are located on each side of a single contact. The tips of those barbs 92 are angled relative to the plane of the lead section of the data contact so that these barbs engage the interior walls of a contact cavity 38 in which the contacts are inserted. This engagement is shown in FIG. 12 that shows that the barbs not only dig into the housing walls defining the mounting cavities, but also bias the contact into engagement with the back wall of the cavity. This back wall is the wall on the opposite side of the cavity from which the contact arm 88 extends. By forcing the contact into engagement with this wall, the data contacts can be more precisely positioned in the cavities 38 and relative to the card slot 10. A push tab 104 is located adjacent to the barbs 92. When the data contacts 12 are inserted into the cavities 38, an insertion tool engages this push tab 104 to force each contact into its corresponding cavity. This configuration makes the contact more stable in the housing and provides for improved contact retention. The contact has three flat areas of contact instead of three points of contact that would result for a standard U-shaped contact. These three flats bias the contact to the one side of the cavity and take up cavity tolerance and improve true positioning of the mating face. This configuration improves the contact retention for the smart card connector to better control normal forces and stresses in the contact beam.

FIG. 7 shows a carrier strip 102 from which a plurality of data contacts 12 extend side by side. These contacts are initially stamped in a generally flat configuration, with the exception of the convex or protruding contact section formed by inclined sections 94 and 98. The contacts are subsequently bent, as shown in FIG. 6, so that the lead portion 94 extends at an acute angle relative to the contact arm 88.

The data contacts 12 are inserted into the cavities 38 in the housing base 4 from above through the top surface of the housing base, with the contacts in their bent configuration shown by the dotted lines in FIG. 6. The contact bend line is adjacent to the contact cavities. When the lead portion of the data contacts 12 are inserted through the cavities to the exterior of the housing, the contact arms 88 initially extend above the upper surface of the housing base 4 as shown by the contact on the left of FIG. 9. The contacts 12 in this position are in a neutral position with no resilient stress in the contact 12 or in the contact arms 88. The contact arms 88 are, however, aligned with the channels 34 between separator ribs 32, as shown in FIG. 2. The contact arms 88 then are snapped into the channels 34 to the preloaded position shown by the contact on the right in FIG. 9. The data contacts still flex about the bend line adjacent to the contact cavities and the contact comprises a spring with a relatively low spring rate. Contact forces exerted on the cards, therefore, are not excessive. The separator ribs 32 forming the channels 34 are flexible and the lateral channel preload tabs 36 are aligned with the contact preload tabs 100. As each contact arm 88 is inserted into its preloaded configuration in its corresponding channel 34, the contact preload tabs 100 engage the channel preload tabs 36 deflecting the corresponding separator ribs 32 on each side of the corresponding channel. Once the contact preload tab 100 snaps below the channel preload tab 36, the contact is retained in its preload configuration with the only the convex contact section protruding above the upper surface of the base 4 and separator ribs 32 and into the card slot 10 located above the base. Therefore, the preloaded contacts extend into the slot 10 by a prescribed amount. The cover 6 then can be attached to the base 4 to form card slot 10. The position of the contact apex 96 on each data contact 12 is now fixed relative to the upper surface of the housing base. Note that the position of the apex 96 is not precisely positioned relative to the centerline of the card slot 10. Different covers can be mounted on the same base subassembly, including the preloaded contacts, to form slots 10 of different thicknesses. The position of the contacts 12 and apex 96 will be the same relative to the contact surface on the card, regardless of the thickness of the card. Furthermore, the contact force exerted by the data contacts 12 will be the same because of the controlled preload.

Figure 15:
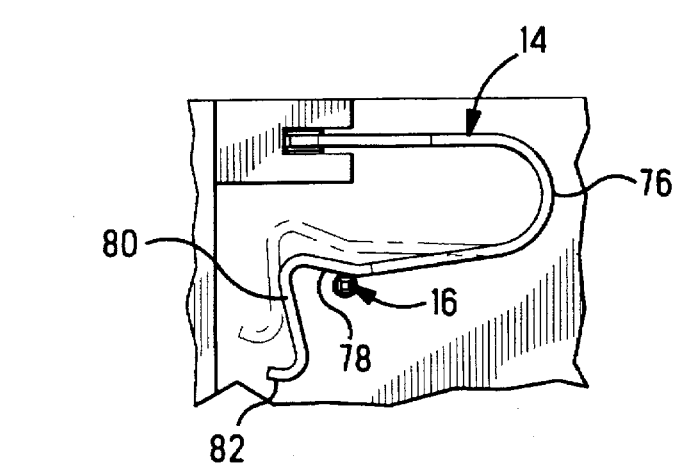
FIG. 15 is a view showing the engagement of the end contact switch spring and contact post.
Figure 16:
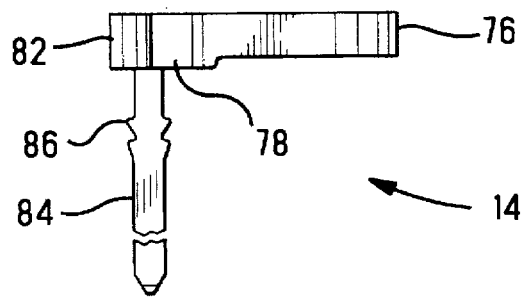
FIG. 16 is a side view of the switch contact spring.

FIG. 15 and 16 show the switch spring 14 and the switch post 16 that together form the normally closed end position switch used in this smart connector. The switch spring 14 comprises a stamped and formed member that is fabricated from a conventional spring metal. The spring is formed in a U-shaped configuration formed by two arms and a connecting bight that together form the deflectable spring section 76. The forward portion of this deflectable spring section joins a wiping contact section 78 that is formed toward the rear portion of the spring at an angle of approximately one hundred sixty degrees. This contact or wiping section 78 joins a forward extension 80 that is formed at an angle of approximately sixty five degrees. This forward extension 80 extends into the card slot 60 when mounted on the housing base 4. A card engaging tab 80 is bent formed on the end of the forwardly extending portion 80 to provide a card engagement surface. When positioned in the housing base 4, the tab would normally be in the card slot 10. The mounting leg 84 is located on the spring at the end of the deflectable section 76 opposite from the wiping contact section. This mounting leg extends generally perpendicular to the other spring sections and includes anchoring barbs 86. When the mounting leg 84 is inserted into spring mounting hole 40 in the housing base 4, these anchoring barbs engage the housing base to secure one end of the spring in the base. The distal end of the leg 84, which includes a tin lead plating, forms a solder tail that extends below the bottom surface of housing base 4 where it can be soldered into a plated through-hole in a printed circuit board.

The post 16 can be any of a number of simple contact pins. In the preferred embodiment, this post 16 is in the form of a brass wire, having a outer diameter of approximately 0.0169 inch, which can be plated with a noble metal in the contact area and can have a tin lead plating at the end to be soldered in a printed circuit board. A interference retention area can be stamped in this post to provide an interference fit of the wire post 16 in the post mounting hole 42 in the recess 30 of the housing base 4. Alternatively, this post could be formed using a conventional square post configuration.

In the normally closed position, the post 16 engages the spring approximately in the middle of the wiping contact section 78. When a card engages the tab 82, the spring 16 can be deflected rearwardly to approximately the position represented by the phantom lines in FIG. 15. In this open position, the spring 16 is no longer in engagement with the post 16. Total travel between the closed and the open positions can be on the order of 0.030 inch. Opening the switch would be interpreted by the smart card reader as indicating that a card had been inserted into card slot 10 into engagement with the rear card stop shoulder 28. At this point the diverter springs 18 would engage the lower surface of the card and would provide a reactive force against the restoring force of the spring 14. When the card is removed, the spring 14 will return to its normally closed position. Since the wiping contact section 78 is angled relative to the spring section 76 and engages the post 16 in an inclined tangential direction, there is a wiping action between the spring 14 and the post 16 tending to remove contaminates from the mating surfaces and ensure reliability of the contact. The U-shaped spring is the only resilient member and this spring occupies less space than the conventional dual resilient members normally used in end position switches.

Figure 17:
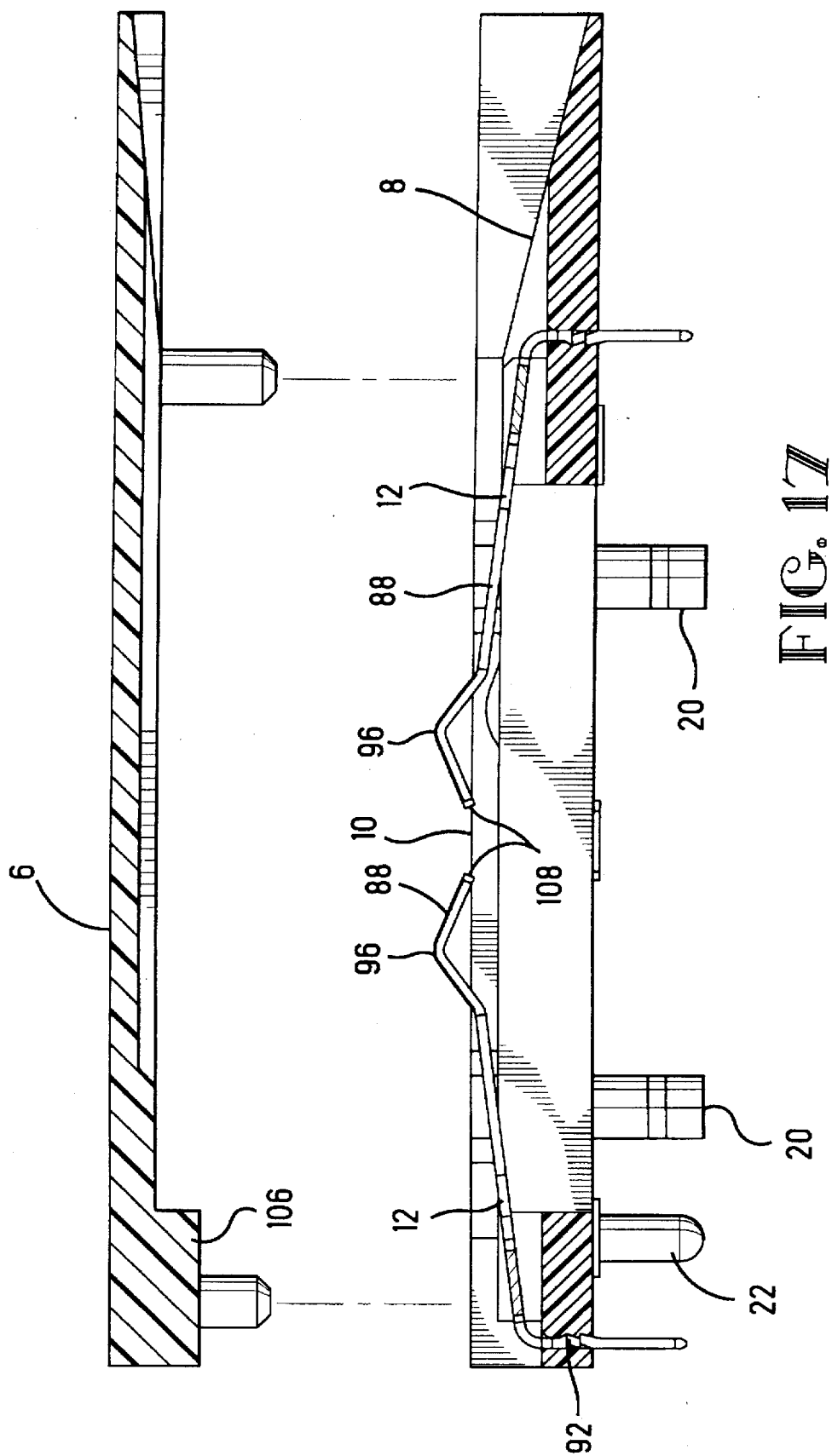
FIG. 17 is a view, similar to FIG. 9 of an alternate embodiment of this invention in which ribs on the cover are used to deflect the rear contacts to prevent stubbing as a card is inserted into the card slot.

FIGS. 17 and 19 are side sectional views of a first alternate embodiment of this invention. FIG. 17 shows the housing base with data contacts 12 positioned in the housing base prior to preloading the contacts. In this embodiment the housing base does not include the lateral protrusions 36 extending from the ribs 32. In all other respects the housing base shown in FIG. 17 is identical to the housing base employed with the preferred embodiment of this invention. The data contacts 12 of this first alternate embodiment do not include the tabs 100 but in all other respects are the same as the data contacts used in the preferred embodiment. The contacts 12 are retained in the housing base in the same manner and they are aligned with the channels 34 below the card slot 10 in the same manner previously described. FIG. 17 shows a cover used in this first alternate embodiment. This cover includes four cover ribs 106 at the rear edge of the cover and in all other respects is identical to the cover 6 shown in FIG. 14. These cover ribs 106 are positioned in alignment with the four rear contacts 12 at the rear of the resilient contact arm or beam 88 adjacent the bend in the contacts where the contacts enter the contact cavities 38. The cover ribs 106 are dimensioned so that these ribs engage the contacts as the cover is attached to the housing base, as shown in FIG. 19. These cover ribs 106 apply a preloading force on the contacts 12 during assembly and the rear contacts 12 are deflected or biased from their neutral configuration to a deflected, biased or preloaded configuration when fully assembled. The ribs 106 are of sufficient height to deflect the rear contacts 12 by a sufficient distance so that the ends of the rear contact enter the channels 34 to substantially the same depth as shown in FIG. 2. The ends or tips 108 of the rear contacts are no longer positioned in the slot 10 so a card inserted into the slot will not stub against these forwardly facing contact ends or tips 108. The contact section including the contact point 96 of each contact still extends into the card slot for engagement with contact areas on the card. The rearwardly facing forward data contacts 12 adjacent to the scoop 8 are also deflected from an unbiased neutral condition during assembly of the cover to the base. The bottom surface of the cover engages these forward contacts in the contact section at the contact point 96. Therefore, these forward data contacts 12 are preloaded during assembly. This configuration is suitable for use with thicker smart or chip cards having, for example, a thickness of about 2 mm.

The second alternate embodiment shown in FIGS. 18 and 20 is similar to the first alternate embodiment shown in FIGS. 17 and 19. This second alternate embodiment is suitable for use with thinner smart or chip cards having, for example, a thickness of about 0.76 mm. The embodiment of FIGS. 18 and 20 is identical to the embodiment of FIG. 17 except that the rib 106 is eliminated from the cover 6 and the cover is dimensioned so that the height of the card slot 10 between cover and the base is less than for the embodiment of FIGS. 17 and 19. In this second alternate embodiment, the cover engages the contact points 96 of both the front and rear data contacts 12 and deflects or preloads the contacts by a sufficient amount that the tips 108 on the contacts are positioned below the card slot 10 in channels 34 so that the tips 108 are not exposed, as shown in FIG. 20. Both of the alternate embodiments use the same data contacts 12 and the same housing base 4. The thick card version of FIGS. 17 and 19 uses one cover and the thin card version of FIGS. 18 and 20 uses a second cover.

Although only three representative embodiments of this invention are depicted herein, other structures incorporating this basic invention would also be apparent to one of ordinary skill in the art. For example, the channel preload tabs could be separate members attached to the housing base after the data contacts are inserted into the mounting cavities. In another example, the data contacts could be insert molded into the housing base with the contact arms being preloaded in the manner depicted herein. If stubbing were the only problem to be addressed in a product incorporating this invention, only the forwardly facing data contacts need be snapped into the contact channels. Selected non-preloaded contacts could also serve the same function as the molded diverter springs. These examples are only some of the modifications to the embodiments depicted herein that would not depart from the invention described herein. Therefore, the following claims should not be interpreted as being limited to these embodiments.

We claim:

1. A connector for use with a smart card reader, comprising:

a housing including a base and a cover, said base including a plurality of spaced apart ribs defining channels therebetween;

a slot located between the base and the cover, and extending into the housing from one side and configured for insertion of a smart card into the slot;

data contacts positioned in the housing and protruding into the slot, the data contacts being positioned to engage a smart card upon insertion into the slot, each data contact comprising a resilient member having an upper portion extending to a free tip, the data contacts including at least one contact mounted at a rear of the housing with the free tip of the upper portion facing forwardly toward a card receiving mouth of said slot, said data contacts further including at least one contact mounted at a front of said housing with the free tip of the upper portion facing rearwardly toward said rear of said housing, at least one of the data contacts being preloaded by deflecting the at least one contact with a part of the housing such that the contact extends along a respective channel and a leading free tip of the contact is received in said channel such that each said preloaded data contact protrudes into the slot a first amount, and remaining data contacts protrude into the slot a second amount, the first amount being less than the second amount; and said cover includes cover ribs for engaging forwardly racing data contacts to deflect the free tip of said at least one the forwardly facing contact into the channels, thereby preloading said at least one forwardly facing contact to prevent said free tip of said at least one contact from being engaged by a loading edge of said card as said card is received in said mouth of said slot and moved rearwardly into said slot.

2. The connector of claim 1 wherein the height of the card slot can be changed by attaching a different cover to a common base, the at least one preloaded contact and the remaining data contacts protruding into the slot by the same respective first and second amounts independent of the height of the slot.

3. The connector of claim 2 further including at least one resilient arm in the base and protruding into the card slot and along side said data contacts that protrude into the slot so that a card inserted into the slot is pushed away from the data contacts during insertion of the card into the card slot thereby reducing wear on the data contacts.

4. The connector of claim 3 wherein said at least one resilient arm comprises an integral portion of the housing base, the resilient arm engaging a card inserted into the card slot to exert a force upwardly tending to prevent inadvertent removal of the card from the slot.

5. The connector of claim 1 wherein the data contacts are inserted into contact cavities through a top surface of the housing base, the top surface of the base comprising the lower surface of the slot.

6. The connector of claim 5 wherein each data contact includes barbs that engage walls of the contact cavities to secure the data contact in its corresponding contact cavity.

7. The connector of claim 6 wherein the barbs force the contact into engagement with the wall of the contact cavity furthest from the contact arm to precisely position the data contact.

8. The connector of claim 6 wherein the ends of the barbs are angled relative to the position of the data contact on which the barbs are located and relative to the sidewalls of the contact cavities.

9. The connector of claim 1 wherein each data contact comprises a contact arm and a leg portion, the contacts being positioned in respective contact cavities in the housing with the data contact leg portions extending from the contact cavities and the contact arms extending into the slot, each contact arms flexing about a bend line adjacent its respective contact cavity.

10. A connector for use with a smart card reader, comprising:

a housing;

a slot extending into the housing from one side and configured for insertion of a smart card into the slot; and data contacts positioned in two rows of contact cavities in the housing, one row adjacent a front of the slot and the other row adjacent a rear of the slot and protruding into the slot, the data contacts being positioned to engage a smart card upon insertion into the slot;

each data contact comprising a resilient contact arm having at least one tab extending laterally therefrom and a leg portion, the contacts being positioned in respective contact cavities with the data contact leg portions extending from the contact cavities and the contact arms being positioned in channels in the housing and extending into the slot such that the contact arms of contacts in respective cavities in each row extend toward the corresponding data contact in the other row, the contact arms flexing about a bend line adjacent the contact cavity, and the contact arms being formed adjacent the ends thereof to form a convex contact section, said at least one tab being between the convex contact section and the leg portion;

at least one of the data contacts is preloaded to control the amount of the resilient contact arm extends into the slot, by deflecting the contact arm of at least one of the data contacts and engaging said at least one tab thereon with a protrusion of the housing channel such that only the convex contact section of each said preloaded data contact extends into the slot, with the contact arms of the remaining data contacts protruding further into the slot, the at least one data contact being preloaded so that a smart card inserted into a front of the slot does not stub against a free end of said at least one data contact; and at least one resilient arm protruding into the card slot and along side said data contacts that protrude into the slot so that a card inserted into the slot is pushed away from the data contacts during insertion of the card into the card slot thereby reducing wear on the data contacts.

11. The connector of claim 9 including several preloaded data contacts wherein the contact arms are located in respective channels in the housing, the contact arms engaging respective protrusions in the housing channels to preload the several data contacts.

12. The connector of claim 10 wherein the channels are formed by ribs extending between the two rows of contact cavities.

13. The connector of claim 11 wherein channel protrusions comprising lateral extensions of the ribs engage several of the data contacts to preload the several data contacts.

14. The connector of claim 13 wherein the channel protrusions extend into each channel from ribs on either side of each channel with the channel protrusions on opposite sides of a rib extending into adjacent channels.

15. The connector of claim 14 wherein the at least one laterally extending tab of each said data contact is positioned to engage the lower surface of a corresponding channel protrusion after the contact arm is snapped into the channel and wherein the ribs are flexible, the contact arms being snapped into its corresponding channel as the ribs flex laterally outward to position the contact arms below the protrusions on the ribs.

16. The connector of claim 15 wherein the channel protrusions are located only at the top of the ribs.

17. The connector of claim 12 wherein free ends of the data contact arms extending toward the front of the slot are positioned below the slot by the engagement of the channel protrusions with the respective contact arms, so that a smart card inserted into the front of the slot does not stub against the free ends of the data contacts.

18. The connector of claim 10 wherein the height of the card slot can be changed by attaching a different cover to a common base, the at least one preloaded contact and the remaining data contacts protruding into the slot by the same respective first and second amounts independent of the height of the slot.

* * * * *